United States Patent [15] 3,658,670
Holicky et al. [45] Apr. 25, 1972

[54] RADIATION CURING OF UNSATURATED AIR-INHIBITED RESINS

[72] Inventors: Donald F. Holicky, Parma; Roger P. Hall, Mayfield Heights, both of Ohio

[73] Assignee: SCM Corporation, Cleveland, Ohio

[22] Filed: Feb. 11, 1969

[21] Appl. No.: 798,469

[52] U.S. Cl. ............204/159.15, 204/159.19, 260/78.5 BB, 260/78.5 E, 260/78.5 T, 260/80.73, 260/80.76, 260/862
[51] Int. Cl. .....................B01j 1/00, C08d 1/00, C08f 21/00
[58] Field of Search................204/159.15, 159.19; 260/862, 260/78.5

[56] References Cited

UNITED STATES PATENTS

| | | | |
|---|---|---|---|
| 3,496,839 | 2/1970 | Harthe | 204/159.14 |
| 3,471,352 | 10/1969 | Brooue et al. | 204/159.14 |
| 3,414,498 | 12/1968 | Shinohara et al. | 204/159.2 |
| 3,317,635 | 5/1967 | Osmond | 260/836 |

*Primary Examiner*—Murray Tillman
*Assistant Examiner*—Richard B. Turer
*Attorney*—Harold M. Baum, Howard G. Bruss and Merton H. Douthitt

[57] ABSTRACT

An improved process for curing an unsaturated air-inhibited thermosetting resin with a vinyl compound copolymerizable therewith suitably by means of radiation with a beam from electron emitting means wherein curling occurs by the addition of unsaturated molecules one to another is described. The improvement is for reducing inhibition of the resin to surface cure and comprises: substituting for at least a fraction of the unsaturated inhibited resin a copolymer comprising a linear saturated backbone having pendant therefrom through linkage selected from the group consisting of ester, ether, urethane, amine, and amide, a plurality of ethylenically unsaturated groups capable of the addition. The copolymer is characterized in having an average molecular weight of between about 5,000 and about 225,000.

7 Claims, No Drawings

RADIATION CURING OF UNSATURATED AIR-INHIBITED RESINS

BACKGROUND OF THE INVENTION

Many unsaturated thermosetting resins exhibit inhibited curing at their air-contact surfaces. Such surfaces are softer than the interiors of the body of the resin and are therefore more easily scratched, marred, and attacked by chemicals such as organic solvents, acids, and alkalies. These qualities are disadvantageous insofar as the integrity of the surface of the thermoset resinous product is concerned and are particularly undesirable when the resin is applied to other surfaces as a film or coating. Attempts to overcome or avoid such inhibition to surface cure have been made, and U.S. Pat. No. 3,210,441 to Dowling et al discloses that the presence of esterified residues of monohydroxy acetals in certain polyester resins produces resins that are free of surface inhibition.

Recently, the polymerization of resinous materials by radiation has been suggested. However, the use of this technique has resulted in the same difficulty with many thermosetting resins, namely, inhibition of cure of the resin surface. Attempts which have been made to overcome inhibition of cure of the resin surfaces irradiated in air by irradiating the resinous material in an inert gaseous atmosphere such as, for example, nitrogen, argon, krypton, etc., or in a vacuum have not been entirely satisfactory.

During penetration by high energy radiation, the resinous material undergoes an "ionization effect" which induces chemical reactions including polymerization, and U.S. Pat. No. 2,863,812 to Graham discloses that such radiation has not been found to have any appreciable ionization effect at the exposed surface of irradiated material. Graham attempted to overcome this difficulty by having electrons pass through an electrically conductive shield before impinging electrons upon the material to be radiated. Such manipulation increases and complicates the apparatus and process used for radiation. In accordance with the process of the present invention, it has been found possible to reduce or eliminate the inhibition to curing on the surface od cured air-inhibited resins by substituting for at least a portion of the inhibited resin a hereinafter defined copolymer prior to irradiation.

The term "air inhibited resin" is used herein in its art recognized sense, that is, it means or refers to resins which when cured exhibit inhibition to complete surface cure whether the curing takes place in air, in a vacuum, or in an inert gaseous atmosphere such as nitrogen.

SUMMARY OF INVENTION

The present invention provides an improved process for cross-linking or curing an unsaturated air-inhibited resin with a vinyl compound copolymerizable therewith by means of radiation with a beam from electron emitting means wherein the curing occurs by the addition of unsaturated molecules one to another. The improvement is for reducing air-inhibition of cure of the surfaces of air-inhibited resins and comprises: substituting for at least a fraction of said unsaturated air-inhibited resin, a copolymer comprising a linear saturated backbone having pendant therefrom through linkage selected from the group consisting of ester, ether, urethane, amine, and amide, a plurality of ethylenically unsaturated groups capable of said addition. The copolymer is characterized in having an average molecular weight of between about 5,000 and about 225,000. By so proceeding, inhibition of cure of the surface of air-inhibited resins is significantly reduced or completely eliminated.

While the use of high energy radiation has been found effective in curing or polymerizing thermosetting resins, its use has not overcome the inhibition of surface cure of a wide variety of resins, particularly thermosetting unsaturated polyester resins in the presence of oxygen, a vacuum, and in a large number of instances, nitrogen as well. The resinous materials of the processes of the present invention are those which are convertible by high energy radiation to higher molecular weight compositions and which possess an inhibition to such conversion in the presence of gases such as nitrogen and/or oxygen.

A wide variety of unsaturated resins suffer to a greater or a lesser degree from this shortcoming. For example, partially cured polybutadiene, polyisocyanate resins, and resins formed from styrene, methacrylates, acrylates, maleates, fumarates, etc., often exhibit air-inhibition. One specific air-inhibited resin is the condensation product of 3 mols of hydroxypropyl methacrylate and 1 mol of hexamethoxymethyl melamine. The resulting product can be employed in the process of the present invention either as the condensation product per se or as further reduced with a vinyl compound such as, for example, a vinyl monomer. The vinyl compound may serve as a solvent for the resin or, if desired, a non-reactive volatile fugitive solvent may be used. However, the process of this invention has its primary application in reducing inhibition of cure of unsaturated polyester resins, especially when these are dispersed in or blended with one or more unsaturated compounds such as vinyl monomers which serve as cross-linking materials.

Unsaturated polyesters are well-known in the art and may be derived from a reaction between alcohols including glycols such as ethylene, propylene, butylene, diethylene, dipropylene, trimethylene, and triethylene glycols, as well as polyols such as glycerol and/or erithrytol and unsaturated polybasic acids including maleic, maleic anhydride, fumaric, chloro maleic, itaconic, citraconic, mesaconic acids, etc.

Typical ethylenically unsaturated monomers include styrene, vinyl toluene, methyl methacrylate, α-methyl styrene, divinyl benzene, dichloro styrene, lower alkyl maleates, lower dialkyl fumarates, ethylene glycol diacrylate, ethylene glycol dimethacrylate, diethylene glycol diacrylate, diethylene glycol dimethacrylate, triethylene glycol diacrylate, triethylene glycol dimethacrylate, tetraethylene glycol acrylate, tetraethylene glycol diacrylate, tetraethylene glycol dimethacrylate, trimethylol propane triacrylate, trimethylol propane trimethacrylate, hydroxyethyl acrylate, hydroxyethyl methacrylate, hydroxypropyl acrylate, hydroxypropyl methacrylate, etc.

A minor amount, that is, up to 40 mol percent of the unsaturated acid can be replaced with saturated and/or aromatic polycarboxylic acids or their chlorinated counterparts. Typical acids used in this instance include phthalic, isophthalic, adipic, pimelic, glutaric, succinic, sebacic, chlorinated phthalic, tetrahydrophthalic, etc. A particular advantage of radiation curing is a low temperature cure since little or no catalyst is included in the resin mix.

The foregoing resinous materials generally have an average molecular weight of about 6,000 and surfaces thereof are inhibited when cured by means of radiation in a vacuum, air, or in nitrogen atmospheres.

The term "radiation" as used herein is intended to include exposure to a beam from electron emitting means. It is also meant to include particle emission or electromagnetic radiation selected from the class consisting of ionizing particles, photons and combinations thereof. The radiation includes particle emission and/or electromagnetic radiation. Where the beam is one comprising particle emission, the particles can be electrons, photons, neutrons, α-particles, and the like. Where the beam involves electromagnetic radiation, such radiation can be radio waves, microwaves, infrared waves, ultra-violet waves, X-rays, gamma rays, and the like.

The energy of the electrons of the beam of radiant energy is an average energy of at least 100 KEV. As a general guide, only that amount of energy need be applied, that, in a particular case, completely penetrates and cures the resin within a time period at least comparable to that for a conventional heat activated reaction for the same material. Excess energy is wasteful and also often results in undesired heating of the resin and the attendant radiation apparatus means with possible charring and other decomposition.

The amount of energy required depends on several factors such as the mass of the resin, extent of prior cross-linking, if any, the distance between the radiation means (e.g., the energy source of the beam and the resin) and the like. The requisite amount of energy may readily be determined by trial and error variation of the above factors.

Suitable means or sources of radiation include conventional radio-active elements such as radium, cobalt 60, strontium 90, X-ray machines and electron accelerators. The latter may be of the type supplying from about 100 to about 300 KEV (thousand electron volts) at a current between about 10 to about 1000 milliamperes. British Pat. No. 949,191 discloses that in most conventional commercial applications, other radiation techniques or electron beams having an energy of between 500 and 4000 KEV have been found especially suitable. The electrons of such beams have a useful penetration of between about 0.1 to about 0.7 inch in organic substances having a specific gravity of around one.

U.S. Pat. No. 3,247,132 issued to Burlant reports that the potential of an electronic beam for radiation purposes may be in the range of about 150,000 to about 450,000 (150–450 KEV) volts.

The terms "microwave" and "microwave energy" as used herein is meant to include electromagnetic wave energy of about $10^7$ to $10^{13}$ cycles per second. Microwaves can be generated by radio frequency power tubes such as the magnetron, ampletron, and klystrom. Their frequencies range between 300 and 300,000 megahertz (MHz). One megahertz is equal to $10^6$ cycles per second. A typical microwave generator which may be employed as means of radiation is described in U.S. Pat. No. 3,216,849 issued to Jacobs. Usually a 10 to 50 second exposure to microwaves is sufficient for curing a resinous material, the time being in proportion to the intensity of the microwaves.

The linear copolymer which is substituted for at least a fraction of the unsaturated air-inhibited resin comprises a linear saturated backbone, the product of addition polymerization. The backbone has pendant therefrom through linkage selected from the group consisting of ester, ether, urethane, amine and amide, a plurality of ethylenically unsaturated groups which are capable of addition polymerization with themselves or with a copolymerizable vinyl monomer. Substitution of at least about 5 weight percent of the polymer will result in a product which will, when exposed to a beam of radiation, cure or cross-link to form a cured product in which the inhibition to surface cure has been significantly reduced and the surfaces are more resistant to chemical attack by solvents, acids, and alkalies than are the surfaces of cured conventional air-inhibited resins.

The substituted polymer may be any of the class above described. Where the plurality of ethylenically unsaturated groups of the substituted copolymer are attached to the saturated backbone through ester linkage, the ethylenically unsaturated groups will be residues of an ethylenically unsaturated acid anhydride, an ethylenically unsaturated acyl halide, an ethylenically unsaturated oxirane, or an ethylenically unsaturated hydroxyl substituted compound, and the copolymer backbone prior to the pendancy of the plurality of ethylenically unsaturated groups will be formed to include a monomer having hydroxyl, carboxyl, oxirane, or halide substituents which will be reactive with ethylenically unsaturated compounds to effect the pendancy of the plurality of ethylenically unsaturated groups to the polymer backbone.

Where the plurality of ethylenically unsaturated groups of the substituted copolymer are attached to the saturated backbone through ether linkage, the unsaturated groups will be residues of an ethylenically unsaturated ether, ethylenically unsaturated halide, or ethylenically unsaturated oxirane compound, and the backbone prior to the pendancy of the ethylenically unsaturated groups will have a plurality of ether, hydroxyl, oxirane, or halide substituents to make the backbone reactive with an ethylenically unsaturated compound.

Where the plurality of ethylenically unsaturated groups of the substituted copolymer are pendant from the saturated backbone through urethane linkage, the plurality of ethylenically unsaturated groups will be residues of an ethylenically unsaturated isocyanate or ethylenically unsaturated hydroxyl substituted compound, and the backbone prior to the attachment of the plurality of ethylenically unsaturated groups will contain a plurality of hydroxyl or isocyanate substituents to make the backbone reactive with an ethylenically unsaturated compound.

Where the substituted polymer contains a plurality of ethylenically unsaturated groups which are attached to the saturated backbone through amine linkage, the ethylenically unsaturated groups will be residues of amine or oxiranes, and the backbone prior to the pendancy of the plurality of ethylenically unsaturated groups will contain a plurality of amine or oxirane substituents.

Where the substituted polymer comprises a saturated backbone having pendant therefrom through amide linkage a plurality of ethylenically unsaturated groups, the ethylenically unsaturated groups will be residues of ethylenically unsaturated amines, ethylenically unsaturated amides, and ethylenically unsaturated aldehydes and the linear backbone prior to the attachment of the plurality of ethylenically unsaturated groups will contain a plurality of reactable substituents such as isocyanate, amide or aldehyde.

The saturated linear backbone of the substituted polymer is an addition polymer and can be formed from a wide variety of ethylenically unsaturated monomers, provided that one of the monomers contains a functional substituent that will react with a reactable ethylenically unsaturated monomer to form an ester, ether, urethane, or amide linkage. The backbone is thus the copolymer of at least one unsubstituted ethylenically unsaturated monomer and an ethylenically unsaturated monomer containing a hereinafter defined functional substituent.

Ethylenically unsaturated monomers other than those containing functional substituents which can form the linear saturated backbone are monomers selected from the class consisting of ethylenically unsaturated substituted and unsubstituted hydrocarbons, ethylenically unsaturated esters of organic and inorganic acids, ethylenically unsaturated organic halides, and ethylenically unsaturated nitriles.

Ethylenically unsaturated hydrocarbons which can form a portion of the polymer backbone include aliphatic hydrocarbons, for example, ethylene, propylene, butylene, amylene, hexalene, heptylene, octylene, and the like. Also included among ethylenically unsaturated hydrocarbons are aromatic hydrocarbons, particularly vinyl and vinylidene hydrocarbons including styrene, α-methyl styrene, vinyl toluene, etc., and their halo-substituted counterparts.

Ethylenically unsaturated esters of organic and inorganic acids which can form a part of the saturated polymer backbone include esters of unsaturated carboxylic acids, for example, the alkyl acrylates, such as ethyl acrylate, propyl acrylate, butyl acrylate, ethyl hexyl acrylate, the corresponding methacrylates, and crotonates, etc. Also included are esters of ethylenically unsaturated alcohols and organic and inorganic acids, for example, vinyl acetate, vinyl butyrate, etc.

Ethylenically unsaturated organic halides which can form a portion of the polymer backbone include the aforementioned vinyl halides such as vinyl and vinylidene chloride, vinyl bromide, etc., and halo-substituted aromatic hydrocarbons such as, for example, chloro styrene, bromo styrene, chloro methyl styrene, chloro bromo styrene, and the like.

Examples of ethylenically unsaturated nitriles which can form a portion of the saturated backbone of the linear polymers include acrylonitrile, methacrylonitrile, crotonitrile, and the like.

The backbone can contain at least one and sometimes more of the monomers falling within the above-mentioned classes. However, the backbone polymers must also contain at least one substituted ethylenically unsaturated monomer having the functional substituents hereinbefore defined.

The terms "functional monomer" and "functional substituents" as used herein are intended to mean and to refer to monomeric compounds or polymers containing hydroxyl, oxirane, carboxyl, carboxylic acid anhydride, isocyanate, ether, amine, or amide substituents.

The term "unsaturated functionality" as used herein is intended to mean and to refer to monomers having ethylenic unsaturation as well as the unsaturation monomer residues comprising the plurality of the unsaturated pendant groups attached to the linear saturated ester-free backbone.

Monomers which can be employed to form a portion of linear polymer backbones containing hydroxyl functionality prior to attachment of the plurality of ethylenically unsaturated groups include, for example, ethylenically unsaturated alcohols, such as allyl, crotyl, α-methyl allyl, β-methyl crotyl allyl alcohols, and the like.

Monomers other than ethylenically unsaturated alcohols which can be employed include hydroxy substituted lower alkyl esters of α, β-ethylenically unsaturated carboxylic acids. Advantageously, hydroxy lower alkyl esters containing from about two to about five carbon atoms in the alkyl group can be employed. Although hydroxyalkyl esters of ethylenically unsaturated carboxylic acids can contain more than about five carbon atoms in the alkyl group, employment of such esters is not usually advantageous and their use can sometimes be economically unfeasible.

Both hydroxyalkyl esters of ethylenically unsaturated mono- and dicarboxylic acids can be suitably employed. Examples of esters of monocarboxylic acids include hydroxyalkyl esters of acrylic, crotonic, isocrotonic, vinyl acetic, methacrylic, tiglic, angelic, senecioic, teracrylic, hypogeic, oleic, elaidic, erucic, brassidic, and behenic acids. Of these, hydroxyethyl, hydroxypropyl, and hydroxybutyl esters of acrylic, vinyl acetic, and methacrylic acids are preferred for economic reasons. Examples of hydroxyalkyl esters of unsaturated dicarboxylic acids include esters of fumaric, maleic, glutaconic, citraconic, itaconic, ethidene malonic, mesaconic, allyl malonic, propylidene malonic, hydromuconic, pyrocinconic, allyl succinic, carbocaprolactonic, and teraconic acids. Of these, hydroxyethyl, hydroxypropyl, and hydroxybutyl diesters of maleic and itaconic acids are preferred because of the low cost and availability of these esters.

Hydroxy lower alkyl esters which have been found to provide particularly advantageous linear polymers are hydroxyethyl acrylate, hydroxypropyl acrylate, hydroxyethyl methacrylate, hydroxypropyl methacrylate, dihydroxyethyl fumarate, dihydroxypropyl fumarate, dihydroxyethyl maleate, and dihydroxypropyl maleate.

When such esters are copolymerized with vinyl monomers such as styrene, ethyl acrylate, methyl methacrylate, acrylonitrile, methacrylonitrile, or crotonitrile, a saturated linear ester-free addition polymer is formed consisting of a backbone containing a plurality of hydroxyl groups.

As will be evident to those skilled in the art, a wide variety of ethylenically unsaturated monomers capable of forming ester groups with the pendant hydroxyl groups of the above-described copolymer backbone can be employed. Such ethylenically unsaturated compounds include ethylenically unsaturated carboxylic acids, ethylenically unsaturated dicarboxylic acid anhydrides, ethylenically unsaturated acyl halides, and the like.

Examples of ethylenically unsaturated carboxylic acids include those of the acrylic series hereinbefore described.

Examples of ethylenically unsaturated dicarboxylic acid anhydrides include maleic and itaconic anhydrides.

Examples of unsaturated acyl halides include acrylyl chloride or bromide and methacrylyl chloride or bromide.

The substituted polymers of this invention are usually dispersed in a vinyl monomer and are conventionally stabilized through the addition of known inhibitors, for example, hydroquinone, to prevent them from cross-linking during storage.

Substituted copolymers wherein the saturated linear backbone, prior to the addition of the plurality of ethylenically unsaturated groups thereto, contains a plurality of pendant oxirane groups are addition polymers of any of the unsubstituted unsaturated monomers plus an ethylenically unsaturated glycidyl compound, for example, glycidyl acrylate, glycidyl methacrylate, allyl glycidyl ether, and monoglycidyl maleate. In such polymer, the plurality of ethylenically unsaturated groups are residues of α, β-ethylenically unsaturated substituted and unsubstituted carboxylic acids.

Substituted resins wherein the linear backbone prior to the addition of ethylenically unsaturated groups thereto contains a plurality of pendant dicarboxylic acid groups are the addition polymers of any of the aforementioned unsubstituted ethylenically unsaturated monomers plus an ethylenically unsaturated dicarboxylic acid anhydride, for example, maleic, or itaconic anhydride, and the plurality of ethylenically unsaturated groups are residues of hydroxyl substituted ethylenically unsaturated compounds, for example, any of the ethylenically unsaturated alcohols hereinbefore described or residues of hydroxyl substituted lower alkyl esters of α, β-ethylenically unsaturated carboxylic acids. The plurality of ethylenically unsaturated groups are pendant from the backbone through ester linkage.

Where the substituted copolymers are composed of a saturated linear ester-free backbone having a plurality of ethylenically unsaturated groups pendant therefrom through urethane linkage, the backbone prior to the pendancy of the ethylenically unsaturated groups thereto will comprise the linear addition polymer of one or more of the aforementioned unsubstituted monomers in addition to an ethylenically unsaturated isocyanate.

Examples of ethylenically unsaturated isocyanates which can be employed to form a portion of the polymer backbone include, for example, allyl isocyanate, isopropenyl isocyanate, 4-isocyanato styrene, vinyl napthalene isocyanate, 5-isocyanato pentene-1, and the like. Other unsaturated isocyantes are isocyanate esters of α, β-ethylenically unsaturated carboxylic acids, and include bis-(2-isocyanato-ethyl) fumarate, bis-(2-isocyanato-ethyl) maleate, isocyanato ethyl acrylate, isocyanato propyl methacrylate, 1-methyl benzene-2-isocyanato-4-carbamic ester propyl methacrylate, bis-(2-isocyanato-1-methyl benzene-4-carbamic ester propyl) maleate, and the corresponding fumarate esters, etc.

The three last-mentioned esters are unsaturated urethane esters having a terminal isocyanate group. The plurality of ethylenically unsaturated groups are appended to the backbone by reacting an unsaturated hydroxy substituted compound, for example, any of the hydroxy substituted ethylenically unsaturated compounds hereinbefore described. There is thus formed a copolymer comprising a linear saturated backbone having pendant therefrom through urethane linkage a plurality of ethylenically unsaturated groups Substituted polymers similar to those described above in that they have a plurality of ethylenically unsaturated groups which are pendant from the backbone through urethane linkage can also be prepared from linear polymer backbones which have prior to the pendancy of the unsaturated groups a plurality of hydroxyl groups. In this instance, the pendant groups will be residues of ethylenically unsaturated isocyanates.

Substituted copolymers containing a saturated linear backbone having pendant therefrom an ethylenically unsaturated ether are prepared by forming a backbone having the plurality of ether, hydroxyl or oxirane groups. Where the backbone prior to the attachment of the plurality of ethylenically unsaturated groups contains a plurality of pendant ether substituents, the plurality of ethylenically unsaturated groups are residues of ethylenically unsaturated ethers which are attached to the backbone through transetherification reaction. Typical unsaturated ethers are methyl vinyl ether, ethyl vinyl ether, propyl vinyl ether, butyl vinyl ether, allyl vinyl ether, phenyl vinyl ether, etc. Transetherification can be readily accomplished by heating a stoichiometric quantity of a hydroxy substituted ethylenically unsaturated compound such as those hereinbefore described in the presence of an acidic catalyst, for example, a Lewis acid catalyst.

Substituted copolymers containing a plurality of ethylenically unsaturated groups pendant through ether linkage can also be prepared from saturated linear polymer backbones containing prior to the attachment of the ethylenically unsaturated groups a plurality of pendant oxirane substituents. In this instance, the plurality of ethylenically unsaturated groups will be residues of ethylenically unsaturated hydroxyl substituted compounds hereinbefore described.

Conversely, the substituted polymers in which the plurality of ethylenically unsaturated groups are residues of ethylenically unsaturated oxiranes can also be prepared from saturated polymer backbones containing prior to the attachment of the groups a plurality of pendant hydroxyl substituents.

Substituted polymers containing a plurality of ethylenically unsaturated groups pendant through amine linkage are prepared by forming a backbone from unsubstituted monomers and an ethylenically unsaturated amine containing at least one hydrogen atom such as, for example, n-methyl amino methacrylate, n-methyl allyl amine, n-ethyl amino acrylate, n-propyl amino ethyl hexyl acrylate, etc. The resultant linear polymer is comprised of a saturated ester-free backbone and contains a plurality of amine groups attached and external to the backbone. The plurality of ethylenically unsaturated groups which can be appended to the backbone include residues of ethylenically unsaturated isocyanates, esters of isocyanates, ethylenically unsaturated halides, and ethylenically unsaturated glycidyl compounds similar to those hereinbefore described.

Substituted copolymers containing a plurality of ethylenically unsaturated groups external to and pendant from the backbone through amide linkage are prepared by including in the saturated linear polymer backbone an ethylenically unsaturated amide, for example, acrylamide, methacrylamide, crotoamide, ortho-vinyl benzamide, meta-vinyl benzamide, etc., and the plurality of ethylenically unsaturated groups are residues of ethylenically unsaturated aldehyde compounds. Such polymers can also be prepared by forming a backbone containing pendant amine or isocyanate groups and reacting the amine groups with ethylenically unsaturated isocyanates or reacting the pending isocyanate substituents with ethylenically unsaturated amines.

Generally the polymers which may be substituted or partially substituted for the air-inhibited resins which are subsequently cured by radiation as herein described comprise a class of linear copolymers consisting essentially of a linear saturated ester-free backbone having pendant therefrom through a linkage selected from the group consisting of ester, urethane, ether, amine, or amide a plurality of ethylenically unsaturated groups, said copolymer being polymerizable with vinyl monomer for thermosetting purposes wherein the backbone is the addition polymer of:

A. from about 40 to about 90 weight percent of at least one monomer selected from the group consisting of
1. mono ethylenically unsaturated substituted and unsubstituted hydrocarbon
2. mono ethylenically unsaturated esters of organic and inorganic acids
3. halides of mono ethylenically unsaturated alcohols
4. mono ethylenically unsaturated nitriles and B. from about 10 to about 20 weight percent of an $\alpha$, $\beta$-mono ethylenically unsaturated mono functional monomer selected from the class consisting of hydroxyl substituted compounds, oxiranes, isocyanates, ethers, amides, and primary and secondary amines;

and where said ethylenically unsaturated groups are pendant from said backbone by virtue of the reaction of a substantially stoichiometric amount of $\alpha$, $\beta$-mono ethylenically unsaturated mono functional monomer reactible with the functional groups pendant from the backbone.

The above-described polymers can be prepared by a process which comprises the steps of:

A. forming a reaction mixture consisting essentially of a liquid organic diluent B. from about 40 to about 90 weight percent, basis the weight of the polymer backbone, of at least one monomer selected from the group consisting of
1. $\alpha$, $\beta$-ethylenically unsaturated substituted and unsubstituted hydrocarbons
2. an $\alpha$, $\beta$-ethylenically mono unsaturated oxirane,
3. an $\alpha$, $\beta$-ethylenically mono unsaturated hydroxyl substituted compound
4. an $\alpha$, $\beta$-ethylenically mono unsaturated monoisocyanate
5. an $\alpha$, $\beta$-ethylenically mono unsaturated primary or secondary amine
6. an $\alpha$, $\beta$-ethylenically mono unsaturated amide;

C. a free-radical catalyst; heating said mixture with agitation in an inert atmosphere and for a time sufficient to form a linear saturated ester-free addition polymer containing polar functionality and selected from the class consisting of ether, oxirane, hydroxyl, isocyanate, amine, and amide groups, said polar functionality being external to said backbone, said polymer being dispersed in said diluent, D. adding to the dispersion so formed
1. when said backbone contains etheral functionality, a substantially stoichiometric amount of a mono hydroxy-substituted $\alpha$, $\beta$-ethylenically mono unsaturated compound and an acidic catalyst, thereby forming said copolymer having a plurality of pendant ethylenically mono unsaturated groups external to the backbone and pendant therefrom through ether linkage;
2. when said backbone contains an ethylenically unsaturated oxirane, a substantially stoichiometric amount of an $\alpha$, $\beta$-ethylenically mono unsaturated monofunctional monomer selected from the group consisting of an ethylenically unsaturated hydroxy compound, ethylenically unsaturated primary or secondary amine, and an ethylenically unsaturated amide, thereby forming said copolymer wherein the plurality of ethylenically unsaturated groups are pendant from the polymer backbone through ether linkage when the unsaturated monomer is an ethylenically unsaturated hydroxy compound, through amine linkage when the ethylenically unsaturated monomer is an ethylenically unsaturated amine, and through amide linkage when the ethylenically unsaturated monomer is an amide;
3. when said backbone contains hydroxyl functionality, a substantially stoichiometric amount of an $\alpha$, $\beta$-ethylenically mono unsaturated mono functional glycidyl compound thereby forming a backbone containing a plurality of ethylenically unsaturated groups pendant from said backbone through ether linkage external to said compound;
4. when said backbone contains amine functionality, a substantially stoichiometric amount of an $\alpha$, $\beta$-ethylenically mono unsaturated mono functional monomer selected from the group of mono unsaturated mono isocyanates and ethylenically unsaturated oxiranes whereby the plurality of said unsaturated groups are pendant from the backbone through amine linkage;
5. when said backbone contains amide functionality, a substantially stoichiometric amount of an $\alpha$, $\beta$-mono ethylenically unsaturated mono functional compound selected from the group consisting of ethylenically unsaturated aldehydes and ethylenically unsaturated oxiranes whereby the plurality of ethylenically unsaturated groups are pendant from the polymer backbone through amide linkage;
6. when said backbone contains carboxyl or carboxyl anhydride functionality, a substantially stoichiometric amount of an $\alpha$, $\beta$-mono ethylenically unsaturated mono functional compound selected from the groups consisting of hydroxyl substituted and oxirane compounds whereby the plurality of ethylenically unsaturated groups are pendant from the polymer backbone through ester linkage;

7. when said backbone contains isocyanate functionality, a substantially stoichiometric amount of an α, β-mono ethylenically unsaturated mono functional hydroxyl compound whereby the ethylenically unsaturated groups are pendant from the polymer backbone through urethane linkage.

E. heating the resultant mixture at a temperature and for a time sufficient to form a linear copolymer having a substantially inert backbone ad containing pendant therefrom and external thereto a plurality of ethylenically mono unsaturated groups.

The polymers so obtained can be suitably used to provide a process improvement in conventional processes for crosslinking unsaturated air-inhibited resins with vinyl compounds copolymerizable therewith by means of radiation with a beam from electron-emitting means wherein curing occurs by the addition of unsaturated molecules one to another. The improvement of such air-inhibited resins and comprises substituting for at least a fraction of said unsaturated air-inhibited resin a linear copolymer wherein the backbone is the addition polymer of:

A. from about 40 to about 90 weight percent of at least one monomer selected from the group consisting of
1. mono ethylenically unsaturated substituted and unsubstituted hydrocarbons,
2. mono ethylenically unsaturated esters of organic and inorganic acids, 3. 3. halides of mono ethylenically unsaturated organic alcohols, and
4. mono ethylenically unsaturated nitriles and B. from about 10 to about 20 weight percent of an α, β-mono ethylenically unsaturated mono functional monomer selected from the class consisting of oxiranes, ethers, hydroxyl compounds, isocyanates, amides, and primary and secondary amines and where said ethylenically unsaturated groups are pendant from said backbone by virtue of the reaction of a substantially stoichiometric amount of an α, β-mono ethylenically unsaturated mono functional monomer reactible with functional groups pendant from the backbone;
said copolymer having an average molecular weight of from about 5,000 to about 225,000.

As noted hereinbefore, the molecular weight of the substituted copolymers is in the range of between about 5,000 and about 225,000 and the substitution of the copolymers for the resin with the process of this invention, preferably is accomplished by employing copolymers having an average molecular weight above the average molecular weight of the air-inhibited resin to insure significant reduction of inhibition of surface cure. Where the resin is an air-inhibited polyester, substituted linear copolymers having a molecular weight between 20,000 and 50,000 have been found to be especially advantageous in reducing and/or eliminating air inhibition of the cured surface of thermoset products.

The amount of the air-inhibited resin fraction for which the copolymers are substituted can be at least about 5 weight percent of the unsaturated resin and will depend to a large extent on the tendency of the resin to exhibit air inhibition during or after cure.

Where the resin is one which, when cured, exhibits extreme lack of cure at its surface, the fraction substituted will be greater than in the instance where the surface cure of the resin is partially inhibited. Advantageously, the linear copolymers can be substituted for from between about 20 to about 90 percent of the resin to provide air-uninhibited liquid thermosettable polymeric products.

Although the processes of this invention contemplate curing processes involving high energy radiation, the substituted compositions can also be cured by free radical catalysis and air inhibition is also reduced. However, the employment of high energy radiation has been found to be particularly advantageous because it results in a low temperature cure wherein polymerization reaction exotherms can be controlled and it has been observed that high temperature cures sometimes tend to aggravate or make more severe the air-inhibition of surface cure of air-inhibited resins.

The invention thus provides an improved process for crosslinking an unsaturated air-inhibited resin with a vinyl compound copolymerizable therewith wherein curing occurs by the addition of unsaturated molecules one to another. The improvement is for reducing air-inhibition of the resulting cured surface when the process is conducted under normal air-inhibiting conditions and comprises substituting for at least a fraction of the unsaturated air-inhibited resin or at least the surface portion thereof a copolymer such as those hereinbefore described and submitting the resultant mass to curing under air-inhibited conditions. The curing process can thus be effected by using a free radical catalyst, high energy radiation or high energy radiation followed by heat or microwave energy, or a combination of these curing means.

The following specific examples are intended to illustrate the invention but not to limit the scope thereof, parts and percentages being by weight unless otherwise specified.

EXAMPLE 1

To a 5 liter reaction vessel equipped with a thermometer, a gas inlet valve, electrical heating coils, mechanical agitator, reflux condenser, and inlet funnels for introducing inert gas and reactants, there was introduced 400 grams of xylene. Into a separate container, there was mixed under a blanket of nitrogen, 35 grams of styrene, 35 grams methyl methacrylate, and 30 grams di(hydroxypropyl) maleate along with 4 grams of benzoyl peroxide. This mixture was charged into the reactor with continuous agitation over a period of 2 hours while the temperature of the reactor contents was maintained at 285°F. Prior to and during the addition of the mixture to the reactor, gaseous nitrogen was continuously sparged through the reactor and the monomer mix. The contents of the reaction vessel were maintained under continuous agitation and at 285°F. for 10 hours at which time substantially all of the styrene, methyl methacrylate, and dihydroxypropyl maleate mixture had polymerized. The contents of the reaction vessel then consisted of a dispersion of approximately 100 grams of a linear polymer having a saturated ester-free backbone which contained hydroxyl groups pendant from and external to the backbone. A portion of the sample was withdrawn and the average molecular weight as determined by gel phase chromatography was found to be 75,000. The polymer had a hydroxyl number of 119.

The temperature of the contents of the reaction vessel was decreased to 225°F. and thereafter, 21 grams of maleic anhydride and a small amount of lithium carbonate were added over a period of about 60 seconds while agitation was continued. Heating and agitation continued for 40 minutes until the maleic anhydride had reacted with the hydroxyl groups of the polymer in the dispersion to form a polymer having pendant mono-maleate groups which contained terminal carboxyl functionality and ethylenic unsaturation which was converted to the hydroxypropyl half ester by propylene oxide addition. Two hundred grams of the xylene were stripped from the polymer dispersion. One hundred grams of styrene which contained 0.030 weight percent of hydroquinone were added to the polymer dispersion. The remainder of the xylene was stripped providing a liquid polymer composition containing 50 percent solids in which the solids consisted essentially of the saturated linear polymer backbone having a plurality of ethylenically unsaturated groups which were residues of the half ester of hydroxy propyl maleate and were pendant through ester linkage from the backbone. The linear polymer was dispersed in styrene.

The foregoing polymer was blended with a thermosetting polyester resin prepared by reacting equi-molar proportions of 1,3-propylene glycol and maleic anhydride. Water was removed by evaporation until the residue had an acid number of 35. About 70 parts of the cooled polyester reaction product was mixed with 30 parts of styrene.

Fifty parts of the linear copolymer were blended with 50 parts of the linear polyester resin. The resulting blend was spread into a film having a thickness of 3 mils, and the film was bombarded with a standard electron accelerator with a radiation of 20 megarads in 5 seconds. The surface of the film obtained was tack-free and mar-resistant.

EXAMPLE 2

To a 5 liter reaction vessel equipped with a thermometer, gas inlet valve, inlet funnels, electrical heating coils, mechanical agitator and a reflux condenser, there was introduced 170 grams of tetrahydrofuran. Thereafter, the temperature of the tetrahydrofuran was raised to 140°F., and there was added under a blanket of nitrogen a mixture of 260 grams styrene, 80 grams of methacrylonitrile, and 9 grams of benzoyl peroxide. Simultaneously through a separate funnel, 100 grams of styrene isocyanate dispersed in an additional 170 grams of tetrahydrofuran were introduced into the reactor. All reactants were slowly added to the reaction vessel over a 4-hour period. The reactor contents were continuously agitated and nitrogen gas was continuously sparged through the reactor during the addition. The contents of the reaction vessel which comprised a reaction mixture of the components above described was held at 140°F. for an additional 6 hours after all of the components had been added to the reaction vessel. During this period, there was formed a linear, saturated ester-free polymer backbone containing a plurality of isocyanate groups pendant from the backbone.

The reactor was then cooled and there was added 690 grams of styrene containing 0.6 gram of quinone, the latter serving as an inhibitor. The tetrahydrofuran was removed from the bulk of the liquid phase of the reaction mixture by stripping in vacuo at a temperature of 125°F. The temperature of the reaction mixture was then raised to 130°F., and there was added, while nitrogen was continuously sparged through the reactor and the reaction mixture was continuously agitated, 40 grams of allyl alcohol. The addition was carried out over a 4-hour period after which there was formed a linear polymer consisting of an unsaturated ester-free backbone having pendant therefrom through urethane linkage a plurality of ethylenically unsaturated groups which were allyl alcohol residues. The linear polymer was dispersed in styrene. The polymer had an average molecular weight of approximately 30,000, as determined by gel phase chromatographic techniques.

A polyester resin was prepared by reacting equi-molar amounts of ethylene glycol and maleic anhydride with water removal until the residue had an acid number of 35. About 70 parts of the resulting condensation resin product was dissolved in 30 parts of styrene. Seventy parts of this resin were blended with 30 parts of the copolymer dispersion described in the first two paragraphs of this example, and a film of the resulting product cured as described in Example 1. The surface of the cured film was tack-free.

When styrene solutions of the polyester resins described in Examples 1 and 2 were cast into films without prior substitution by blending of the copolymers described in these Examples and cured with the same radiation means and dose, the cure of the film surface was inhibited as evidenced by a tacky adhesive surface.

EXAMPLE 3

To a one gallon pressure autoclave equipped with a thermometer, a gas inlet valve, heating and cooling coils, mechanical agitator, and inlet funnels for introducing inert gas and reactants, there is added 1,000 grams of xylene. Into a separate container, there is mixed under a blanket of nitrogen, 800 grams of styrene, 150 grams of methacrylonitrile, and 10 grams of benzoyl peroxide. Fifty grams of methyl vinyl ether were charged to a nitrogen pressure bomb. The mixture and the methyl vinyl ether were charged into the autoclave simultaneously through separate funnels while the contents were continuously agitated and the temperature maintained at 280°F. and at a pressure of 150 lbs. psig. Prior to and during the addition of the reactants to the autoclave, a blanket of gaseous nitrogen is maintained and the contents are maintained under continuous agitation for 16 hours after which time substantially all of the styrene, methacrylonitrile, and methyl vinyl ether have polymerized. The contents of the reaction vessel then consist of a dispersion of approximately 1,000 grams of a linear polymer having a saturated ester-free backbone and which contains methoxy (e.g., methyl ether groups) pendant from an external to the polymer backbone. When a portion of the sample is withdrawn and the average molecular weight determined by gel phase chromatographic techniques, the polymer has an average molecular weight of about 50,000. The temperature of the contents of the autoclave is decreased to 180°F. The pressure is 100 psig., and thereafter, 99.7 grams of hydroxyethyl acrylate containing 0.015 weight percent of hydroquinone and 10 grams of sulfuric acid are simultaneously added over a period of 30 minutes while agitation and heating are continued. Heating and agitation are continued for an additional hour until the hydroxy ethyl acrylate has undergone transetherification with the pendant methoxy groups to form a polymer having a plurality of pendant ethyl acrylate groups which contain ethylenic unsaturation.

During the transetherification reaction, the methoxy moiety reacts with the hydroxyl groups of the hydroxyethyl acrylate to form methanol. At the conclusion of the reaction, the methanol is removed by heating the mixture in vacuo and 500 grams of the xylene are also stripped by distillation in vacuo and 1,073 grams of styrene containing 0.015 weight percent of hydroquinone are added to the polymer dispersion. The remaining xylene is then stripped to provide a liquid polymer composition containing 50 percent solids in which the solids consist essentially of a saturated polymer backbone having a plurality of pendant ethylenically unsaturated groups which are etherified hydroxy ethyl acrylate residues and are attached through ether linkage to the backbone. The linear polymer is dispersed in styrene.

Fifty parts of the linear copolymer were blended with 50 parts of the linear polyester resin. The resulting blend was spread into a film having a thickness of 3 mils, and the film was bombarded with a standard electron accelerator with a radiation of 20 megarads in 5 seconds. The surface of the film obtained was tack-free and mar-resistant.

EXAMPLE 4

To a 5 liter reaction vessel equipped with a thermometer, a gas inlet valve, heating and cooling coils, mechanical agitator, reflux condenser, and inlet funnels for introducing inert gas and reactants, there is added 100 grams of tetrahydrofuran. In a separate container, there is mixed 800 grams of styrene, 100 grams of acrylonitrile, 100 grams of methallyl amine, and 10 grams of lauroyl peroxide. This mixture is charged into the reactor over a period of 4 hours under continuous agitation and nitrogen sparge while the contents of the reactor are maintained at 150°F. Thereafter, the contents of the reaction vessel are held at this temperature under continuous agitation and nitrogen sparge for an additional 12 hours until the polymerization reaction is completed. A portion of the sample is withdrawn and the average molecular weight, determined by gel phase chromatographic techniques, is found to be 45,000. The polymer is a linear saturated ester-free terpolymer having amine groups pendant from the linear backbone dispersed in tetrahydrofuran.

The temperature of the contents of the reaction vessel is decreased to 78°F. and thereafter, while nitrogen sparge and agitation are continued, 398 grams of glycidyl methacrylate containing 0.015 weight percent hydroquinone are added over a period of about 60 minutes while the contents of the reaction vessel are maintained at the last-mentioned temperature, and continuous agitation and nitrogen sparge are maintained. The resulting product is a linear polymer consisting of a saturated ester-free backbone having pendant therefrom through amine linkage a plurality of ethylenically unsaturated groups comprising glycidyl methacrylate residues.

One-half of the tetrahydrofuran is removed from the polymer by stripping in vacuo and thereafter, 1,398 grams of styrene containing 0.015 weight percent hydroquinone are added to the polymer. The remaining tetrahydrofuran is removed by repeating the stripping operation.

The resultant product is a thermosettable liquid consisting of a dispersion of a linear polymer which is unsaturated by virtue of a plurality of ethylenically unsaturated groups pendant from the backbone and a copolymerizable vinyl monomer (e.g., styrene).

A polyester resin was prepared by reacting equi-molar amounts of ethylene glycol and maleic anhydride with water removal until the residue had an acid number of 35. About 70 parts of the resulting condensation resin product was dissolved in 30 parts of styrene. Seventy parts of this resin were blended with 30 parts of the resin dispersion described in the first four paragraphs of this example, and a film of the resulting product cured as described in Example 1. The cured film obtained was tack-free and mar-resistant.

EXAMPLE 5

To the reaction vessel described in Example 4, there is added 1,000 grams of toluene. In a separate container, there is mixed under a blanket of nitrogen, 800 grams of styrene, 100 grams of methacrylonitrile, 100 grams of acrylamide, and 10 grams of benzoyl peroxide. This mixture is charged into the reactor over a period of 4 hours under continuous agitation and nitrogen sparge while the contents of the reactor are maintained at 240°F. The temperature, agitation, and nitrogen sparge are maintained in the reactor for an additional 12 hours until polymerization is completed. Thereafter, a portion of the sample is withdrawn and the average molecular weight, determined by gel phase chromatography, is found to be approximately 45,000. The polymer obtained is a substantially linear saturated ester-free terpolymer having pendant amide groups external to the backbone. The temperature of the contents of the reaction vessel is then decreased to 230°F. and while nitrogen sparge and agitation are continued, 98 grams of crotonaldehyde and 1 gram of sulfuric acid catalyst are added to the reaction mixture over a 30-minute period.

The reactor is held under these conditions for an additional 2 hours until the crotonaldehyde has reacted with the dispersion to form a polymer having crotonaldehyde residues, thereby providing ethylenic unsaturation.

Five hundred grams of toluene are stripped in vacuo from the polymer dispersion and 1,098 grams of styrene containing 0.015 weight percent hydroquinone are added to the polymer dispersion. The remainder of the toluene is then removed by stripping to provide a liquid polymer composition containing 50 percent solids consisting essentially of a linear saturated ester-free polymer backbone having a plurality of ethylenically unsaturated groups comprising residues of crotonaldehyde, which are pendant from the backbone through amide linkage and which are dispersed in the styrene.

Fifty parts of the linear copolymer were blended with 50 parts of the linear polyester resin dispersion described in Example 1. The resulting blend was spread into a film having a thickness of 3 mils, and the film was bombarded with a standard electron accelerator with a radiation of 20 megarads in 5 seconds. The surface of the cured film obtained was tack-free and mar-resistant.

EXAMPLE 6

To a reaction vessel, there was added 400 grams of ethylene glycol monoethyl ether.

To a separate container, there was mixed 220 grams of styrene, 60 grams of acrylonitrile, 120 grams of dihydroxypropyl maleate and 4 grams of benzoyl peroxide. This mixture was charged into the reactor over a period of 2 hours under continuous agitation while the contents of the reactor were maintained at 185°F. The contents of the reaction vessel were held under the nitrogen sparge, continuously agitated, and maintained at 185°F. for 10 hours until polymerization had been completed. A portion of the sample was withdrawn and the average molecular weight, determined by gel phase chromatography, was found to be 85,000. The thermoplastic polymer was a linear saturated ester-free terpolymer having pendant hydroxyl groups.

The temperature of the contents of the reaction vessel was increased to 225°F. and thereafter while the nitrogen sparged and agitation was continued, 518.4 grams of maleic anhydride and a small amount of lithium carbonate were added over a period of about 60 seconds, then 308.4 grams of propylene oxide were added while the contents of the reaction vessel were maintained at a reflux temperature of 250°F. using adequate cooling means to prevent oxide loss. The resulting product was a linear polymer consisting of a saturated ester-free backbone having pendant therefrom through ester linkage with the hydroxyl groups, a plurality of hydroxypropyl maleate groups dispersed in ethylene glycol monoethyl ether hydroxypropyl maleate.

The contents of the reaction vessel were increased to 280°F. and 16.3 grams of piperidene, an isomerization catalyst, were added. The contents were agitated and held for 4 hours at this temperature after which the contents of the reaction vessel were cooled to 240°F. and consisted essentially of the linear polymeric backbone on which pendant maleic acid groups attached through ester linkages had been converted to fumarate groups. The reaction mixture was then cooled to 240°F. and 0.34 grams of hydroquinone were dispersed over a 5-minute period with agitation. The resulting polymer solution was then reduced in 696 grams of styrene. The resulting product consisted of a linear thermoplastic polymer having engrafted thereon through ester linkage a plurality of hydroxypropyl fumarate groups. The average molecular weight of the polymer, determined by gel phase chromatography, was found to be 100,000.

Fifty parts of the linear copolymer were blended with 50 parts of the linear polyester resin dispersion described in Example 1. The resulting blend was spread into a film having a thickness of 3 mils, and the film was bombarded with a standard electron accelerator with a radiation of 20 megarads in 5 seconds. The surface of the cured film obtained was tack-free and mar-resistant.

EXAMPLE 7

Four hundred fifty grams of 2-ethoxy ethanol were added to the reaction vessel described in Example 1.

The following ingredients in the amounts listed below were added and mixed under a blanket of nitrogen in a separate container.

| Ingredients | Grams |
|---|---|
| Hydroxypropyl methacrylate | 100 |
| Ethyl acrylate | 400 |
| Styrene | 500 |
| Benzoyl peroxide | 15 |
| Tertiary butyl perbenzoate | 15 |

The 2-ethoxy ethanol in the reactor was heated to reflux and the above mixture was charged to the reactor over a 3-hour period while the contents were maintained under continuous agitation and at a temperature of 125° ± 3°C. Prior to and during the addition of the mixture gaseous nitrogen was continuously sparged through the reactor and its contents. After the addition of the mixture was completed, the reactor contents were maintained under conditions of reflux, continuous agitation and nitrogen sparge for an additional hour, after which, while heating and agitation were continued. Then one gram of additional tertiary butyl peroxide was charged to the reactor and contents were maintained under the same conditions for an additional 4-hour period until all of the hydroxypropyl methacrylate, ethyl acrylate and styrene had polymerized to form a linear ester-free backbone containing a plurality of pendant hydroxyl groups. The polymer has an average molecular weight of about 20,000.

Thereafter while agitation and nitrogen sparge were continued, the temperature of the reactor contents was heated about to 100°C. and 558 grams of maleic anhydride were added over a 30-minute period. During the addition, the temperature of the contents of the reactor contents increased to 130° ± 3°C. and heating and agitation were continued for an additional 30 minutes after completion of the addition of the maleic anhydride. There was then added 2.4 grams of lithium carbonate and 364 grams of propylene oxide, the latter being added over a 1-hour period.

The contents of the reactor were maintained for an additional hour under the same temperature, agitation and nitrogen sparge conditions and an additional 558 grams of maleic anhydride were added over a 60-minute period, then 364 grams of additional propylene oxide were added, the contents of the reactor being held for an additional 60 minutes after the addition of the propylene oxide. Thereafter another additional 558 grams of maleic anhydride were charged to the reactor over a 30-minute period and the contents in the reactor were held under the above-described reaction conditions for an additional 30 minutes after which another additional 364 grams of propylene oxide were added over a 1-hour period and the contents of the reactor were maintained under the same reaction conditions for an additional 60 minutes.

The resultant reaction mixture consisted essentially of a polymer comprising a linear saturated ester-free backbone having pendant therefrom through ester linkage a linear residue consisting of three successive hydroxypropyl maleate esters. In other words, the plurality of pendant unsaturated groups had polyunsaturation by virtue of the successive addition of three mols of maleic unsaturation through esterification effected by propylene oxide addition. The polymer was dispersed in the cellusolve tri-ester, the ester also containing polyunsaturation by virtue of the successive formation of three mols of hydroxypropyl maleate. The resultant product was converted from maleate unsaturation to fumarate unsaturation by the addition of 42 grams of piperidene and 0.086 grams of hydroquinone and heating the mixture to 135° ± 3°C. for 4 hours to isomerize the maleate moieties to fumarate.

A film of the resultant polymer composition was applied to a metal plate at a thickness of 0.5 mils and subjected to 2 megarads of 500 kilo electron volt radiation in an atmosphere of nitrogen. The resulting cured film was a tack-free and mar-resistant coating.

This application contains subject matter related to that contained in five copending patent applications Ser. No.'s 798,439, 798,458, 798,461, 798,470, and 798,769, filed simultaneously with the instant application and assigned to the same assignee.

What is claimed is:

1. In a process for crosslinking an unsaturated air-inhibited resin, wherein said unsaturated air inhibited resin is the reaction product of a polycarboxylic acid and a polyol having an average molecular weight below about 6,000 with a vinyl compound copolymerizable therewith by means of radiation selected from the group consisting of a beam from electron-emitting means and micro-wave energy with a beam from electron-emitting means wherein curing occurs by the addition of unsaturated molecules one to another, the improvement for reducing air inhibition which comprises:
    substituting for at least about 5 weight percent of said unsaturated air-inhibited resin a linear copolymer having an average molecular weight greater than the average molecular weight of said unsaturated resin wherein the backbone is the addition polymer of
    A. from about 40 to about 90 weight percent of at least one monomer selected from the group consisting of:
        1. mono ethylenically unsaturated substituted and unsubstituted hydrocarbons,
        2. mono ethylenically unsaturated esters of organic and inorganic acids,
        3. halides of mono ethylenically unsaturated organic alcohols, and
        4. mono ethylenically unsaturated nitriles, and
    B. from about 10 to about 20 weight percent of an $\alpha$, $\beta$-mono ethylenically unsaturated mono functional monomer selected from the class consisting of oxiranes, ethers, hydroxyl compounds, isocyanates, amides, and primary and secondary amines and where said ethylenically unsaturated monomers are pendant from said backbone by virtue of the reaction of a substantially stoichiometric amount of said $\alpha$, $\beta$-mono ethylenically unsaturated mono functional monomer reactible with functional groups pendant from the backbone, said copolymer having an average molecular weight of from about 5,000 to about 225,000.

2. The process of claim 1 wherein said cross-linking is conducted in an inert atmosphere.

3. The process of claim 1 where, in said linear copolymer, the plurality of ethylenically unsaturated groups are attached to the backbone through ester linkage.

4. The process of claim 1 where, in said linear copolymer, the plurality of ethylenically unsaturated groups are attached to the backbone through ether linkage.

5. The process of claim 1 where, in said linear copolymer, the plurality of ethylenically unsaturated groups are attached to the backbone through urethane linkage.

6. The process of claim 1 where, in said linear copolymer, the plurality of ethylenically unsaturated groups are attached to the backbone through amine linkage.

7. The process of claim 1 where, in said linear copolymer, the plurality of ethylenically unsaturated groups are attached to the backbone through amide linkage.

* * * * *